April 11, 1967
A. C. WALKER ETAL
SELF-CENTERING SPEED CONTROL
FOR HYDRAULIC TRANSMISSIONS
3,313,174
Filed Nov. 18, 1963
2 Sheets-Sheet 1
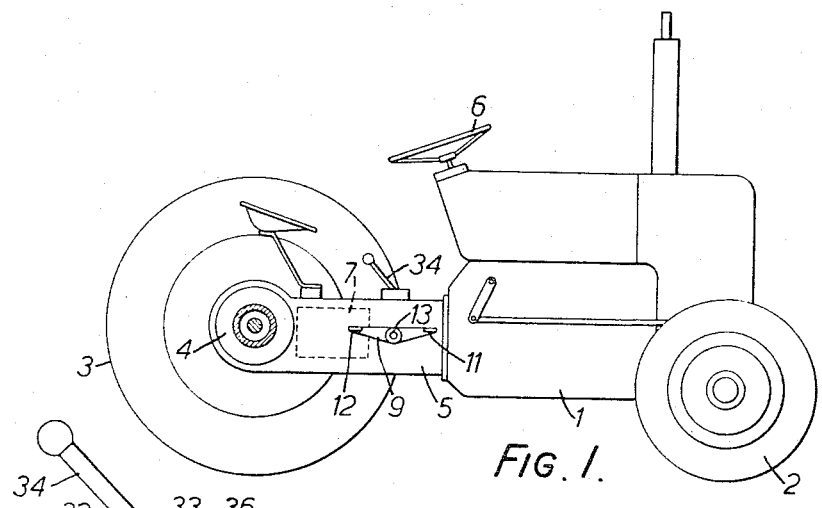
FIG. 1.
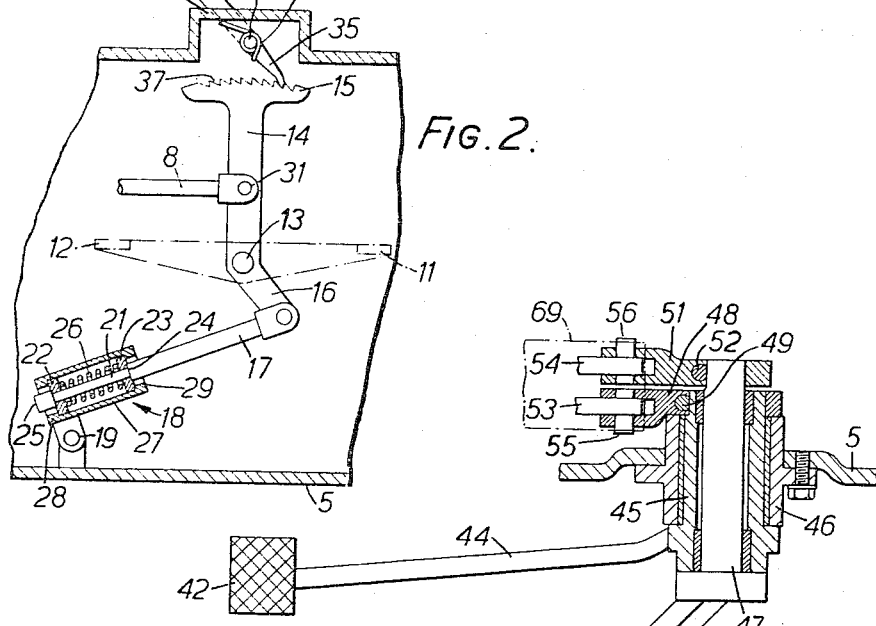
FIG. 2.
FIG. 3.
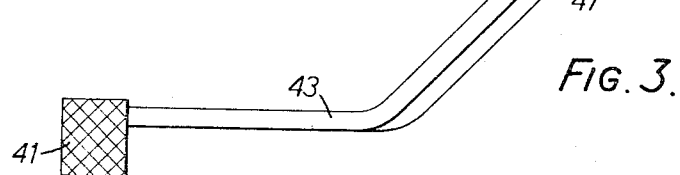
INVENTORS
ALLEN CHIVERS WALKER
DERRICK THOMAS NEWMAN
BY THOMAS DESMOND HUDSON
ANDREWS
EDWARD VICTOR WARD
Reynolds & Christensen
ATTORNEYS United States Patent Office 3,313,174
Patented Apr. 11, 1967

3,313,174
SELF-CENTERING SPEED CONTROL FOR
HYDRAULIC TRANSMISSIONS
Allen C. Walker, Longridge, near Stroud, Derrick T. Newman, Cheltenham, Thomas D. H. Andrews, Leckhampton Hill, Cheltenham, and Edward V. Ward, Cheltenham, England, assignors to Dowty Technical Developments Limited, Cheltenham, England, a British company
Filed Nov. 18, 1963, Ser. No. 324,493
Claims priority application Great Britain, Nov. 23, 1962, 44,504/62; Jan. 3, 1963, 336/63; July 11, 1963, 27,451/63
4 Claims. (Cl. 74—474)

This invention relates to hydraulic apparatus and more particularly to a hydraulic power transmission comprising a hydraulic pump in hydraulic connection with a hydraulic motor and means such as a variable displacement control or valve to adjust the speed ratio between pump and motor.

In accordance with the present invention a control apparatus for the adjustment of the speed ratio of a hydraulic power transmission comprises a pair of pedals, a lever mounted by a central pivot and connected such that angular movement thereof about the pivot in one direction will adjust the transmission speed ratio towards one limit of adjustment and in the other direction will adjust the speed ratio toward the other limit of adjustment, operative connections between the pedals and the two end portions of the lever, and spring loading means for the lever which will tend to move the lever to a predetermined angular position. Preferably such position represents the zero speed ratio condition of the transmission, angular movement in one direction adjusting speed ratio in the forward sense and angular movement in the opposite direction adjusting speed ratio in the reverse sense.

Locking means may be provided to lock the lever in a predetermined position so that the operator may maintain a predetermined speed ratio of the transmission without needing continuously to maintain the pedal depressed against the loading of the spring.

The spring is preferably arranged to operate so that more than a predetermined force must be exerted on either pedal in order to move the lever.

Figure 4:
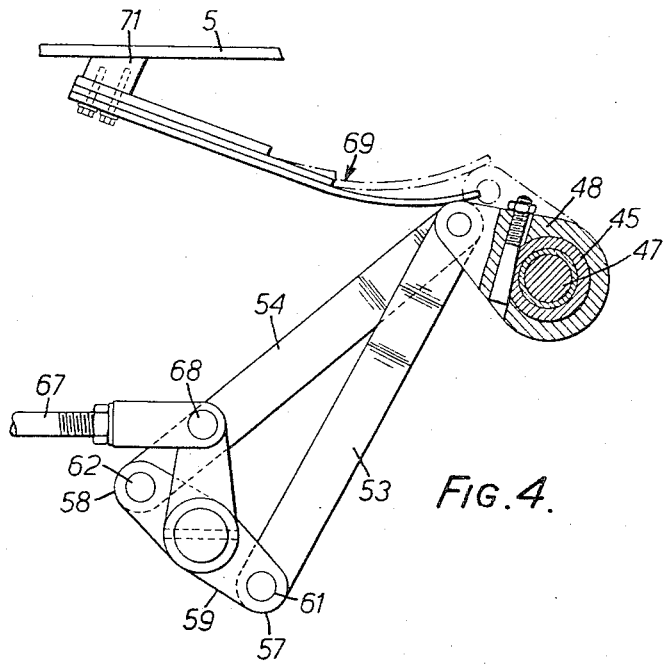
Figure 5:
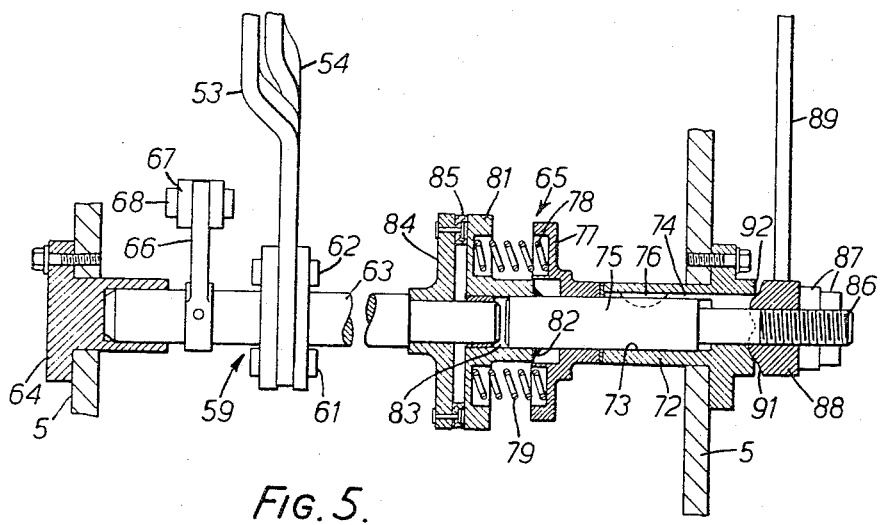

Two embodiments of the invention will now be described with reference to the accompanying drawings, in which, FIGURE 1 is an elevation of an argricultural tractor partly in section having one embodiment of the invention applied for the control of a hydraulic power transmission which transmits power from the tractor engine to the ground engaging wheels, FIGURE 2 is an enlarged view in cross section through part of the tractor of FIGURE 1 illustrating the invention in detail, FIGURE 3 is an enlarged view in cross section through the same part of the tractor, but with a modified form of the invention, FIGURE 4 is a similar view of the modification, but at a right angle to that of FIGURE 3; and FIGURE 5 is a third such view at still another angle.

Referring initially to FIGURE 1 the tractor as shown comprises an engine 1, front ground engaging wheels 2, rear ground engaging wheels 3, rear axle casing 4 and transmission casing 5 which interconnects the engine 1 with the axle casing. The wheels 2 are steerable by a steering wheel 6 in conventional manner. Within the casing 5 is located a hydraulic power transmission 7 which transmits power between the engine 1 and the rear ground engaging wheels 3. The transmission 7 may be of any known type which is adjustable to vary the speed ratio between the input drive from the engine and the output drive to the rear wheels. This transmission may, for example, comprise the transmission disclosed in our co-pending Patent No. 3,142,963 issued Aug. 4, 1964. Generally speaking a hydraulic power transmission for use in the present invention may comprise a variable positive displacement pump in hydraulic connection with a fixed or variable displacement hydraulic motor. The speed ratio of such a transmission is adjusted either by varying the pump displacement only if the motor displacement is fixed, or alternatively, by varying pump displacement and motor displacement differentially where the motor displacement is variable.

For the adjustment of the speed ratio of the hydraulic transmission 7, the rod 8 (FIGURE 2) fully extends to the transmission 7, longitudinal movement of the rod 8 adjusting the speed ratio of the transmission. For adjustment of the transmission speed ratio a lever 9 is mounted substantially horizontally on the side of the casing 5 in a position accessible to one of the driver's feet. As shown the pedals are located for operation by the right foot. At the front end of the lever 9 a pedal 11 is formed whilst at the rear end a pedal 12 is formed, these pedals projecting horizontally away from the casing 5. Preferably the spacing between the pedals 11 and 12 is sufficiently large that the driver cannot simultaneously place heel and toe on the pedals, but rather must apply his heel or his toe alternatively to the pedals 12 and 11. The pedals 11 and 12 are directly secured to the lever 9. The lever 9 is carried by a central pivot in the form of a horizontal shaft 13 carried in suitable bearings in the wall of the casing 5. The lever 9 is fixedly secured to the shaft 13. Internally of the casing 5 the shaft 13 is secured to a substantially vertically disposed lever 14 which at its upper end carries a serrated quadrant 15. An extension 16 of lever 14 extends below the shaft 13 and at its end portion is pivotally connected to a rod 17. The rod 17 extends to a caged spring unit 18 secured by a pivot 19 to the lower wall of the casing 5. Near its opposite end the rod 17 includes a portion 21 of reduced diameter on which are located a pair of sliding stops 22 and 23. The stops 22 and 23 are of annular form, the inner diameter being sufficiently small that they cannot slide beyond the shoulders 24 and 25 of the rod 17, which shoulders define the reduced portion 21. Between the stops 22 and 23 a compression spring 26 is located under substantial compression. Around the spring 26 and the stops 22 and 23 an open ended cylinder 27 is located having inwardly directed flanges 28 and 29 at its opposite ends whose inner diameter is sufficiently small to engage the stops 22 and 23 but not to engage the rod 17. The pivotal connection 19 extends from the cylinder 27.

The arrangement of the caged spring unit 18 is such that if the rod 17 moves to the left, as shown in the drawing, stop 22 will engage flange 28 and shoulder 24 will engage stop 23 to compress spring 26 further. Alternatively if the rod 17 is moved to the right as seen in the drawing the stop 23 will engage the flange 29 and the shoulder 25 will engage the stop 22 again to compress the spring 26 further. Thus the spring 26 will act to hold the rod 17 in a position in which stop 22 engages both shoulder 25 and flange 28 and the stop 23 engages both shoulder 24 and flange 29. To move the rod in either direction from this position requires that a force must be exerted on the rod 17 which overcomes the loading of the spring 26.

Force exerted by the driver on either the pedals 11 or 12 will act through lever 9 on the shaft 13 and lever extension 16 to tend to cause movement of the rod 17 in one direction or the other.

The speed ratio adjusting rod 8 is secured by pivot 31 to the lever 14.

The upper wall of the casing 5 includes a small enlargement 32 through which a shaft 33 extends horizontally. Externally of the enlargement a manual control lever 34 is secured to the shaft 33. Internally of the enlargement 32 a pawl 35 is secured to shaft 33. A torsion spring 36 around the shaft 33 engages the pawl 35 to tend to urge it in the anticlockwise direction sense as seen in FIGURE 2 so as to disengage from the quadrant 15. The quadrant 15 includes teeth 37 engageable by the pawl 35.

In driving the tractor of FIGURE 1 the driver will press on the pedal 11 with his right foot in order to adjust the speed ratio of the transmission for forward movement. Pressing on the pedal 11 will cause lever 14 to move in the clockwise sense the rod 17 moving to the left against the loading of spring 26. If the driver desires to move forwardly at a steady speed without maintaining force on the pedal 11 he will lift the lever 34 to cause pawl 35 to engage the teeth 37. The return force exerted by spring 26 will act through one of the teeth 37 on pawl 35 with sufficient force to prevent pawl 35 from being disengaged by the action of spring 36. In the event that the driver wishes to reduce the forward speed ratio he will press lever 34 to disengage pawl 35. The spring 36 will then hold the pawl 35 in a disengaged condition whilst the lever 14 will return under the action of spring 26 to the zero speed ratio position of the rod 8. The quadrant 15 is so arranged that it is in position to co-operate with pawl 35 only when forward speed ratio is selected. Reverse speed ratio is selected by the driver pressing with his right foot on the pedal 12 which will move lever 14 and rod 8 in the reverse speed ratio direction. Normally speaking reverse speed ratio is used only for a small proportion of the total use of the tractor and in this embodiment locking means are not provided for locking lever 9 during reverse propulsion. Braking is obtained when the driver lifts his foot from the pedals to allow the spring 26 to reduce transmission speed ratio to zero.

Reference is now made to the embodiment of the invention shown at FIGURES 3, 4 and 5. This embodiment is intended to form part of a tractor such as shown in FIGURE 1 in substitution for the mechanism shown in FIGURE 2. A pair of pedals 41 and 42 in side by side arrangement are provided carried by levers 43 and 44. The lever 44 is fixedly secured to a hollow shaft 45 which is rotatably mounted within a sleeve bearing member 46 suitably secured in the wall of the casing 5. Extending through the shaft 45 is a further shaft 47 which at its outer end is fixedly secured to the lever 43. Internally of the casing 5 a short lever 48 is secured by a cotter pin 49 to the shaft 45. A further lever 51 is secured in substantially parallel relation with the lever 48, to the inner end of the shaft 47 by means of a cotter pin 52. The ends of the two levers 48 and 51 are bifurcated to receive respectively the links 53 and 54, these links being secured in position respectively by the pivot pins 55 and 56. The links 53 and 54 extend to the bifurcated ends 57 and 58 of a centrally pivoted lever 59, being secured in position by pivot pins 61 and 62. The pivotal mounting of the lever 59 comprises a shaft 63 to which it is fixedly secured, which shaft is carried at its left hand end as seen in FIGURE 5 in a fixed bearing 64 mounted in the wall of the casing 5. At the right hand end the shaft 63 is mounted in a friction clutch assembly 65. Also fixedly secured to the shaft 63 is a further lever 66 to which a link 67 is pivotally connected by pin 68. Link 67 extends to the speed ratio control of the transmission 7.

The spring loading for the centrally pivoted lever 59 is provided by a leaf spring 69 clamped at one end to a mounting block 71 secured to the upper wall of the casing 5 and pressing at its other end on the two adjacent ends of levers 48 and 51. The spring 69 is of sufficient width as indicated in dotted lines in FIGURE 3 to press on the ends of both levers 48 and 51. By virtue of the fact that levers 48 and 51 are connected to the ends of the centrally pivoted lever 59 they must move in opposite senses and the spring 69 will therefore always urge levers 48 and 51 to a position in which it can press substantially equally on the ends of both of these levers. This position is arranged to correspond with the zero speed ratio position of the transmission. Angular movement of the lever 59 in either direction from this zero speed ratio position must be against the loading of the spring 69 since the spring will press on whichever of the levers 48 or 51 moves upwardly as seen in FIGURE 1.

For the purpose of locking the centrally pivoted lever 59 in any selected position the friction clutch assembly 65 is provided which is carried by a bush 72 fixedly secured to the side wall of the casing 5 opposite to the wall carrying the bush 64. The bush 72 includes an axial bore 73 within which is formed a longitudinal keyway 74. Within the bore 73 a plunger 75 is slidably mounted, rotation of this plunger being prevented by means of a key 76 fitted to the plunger and engaging the keyway 74. Loosely carried on the shaft 75 adjacent to the inner end of bush 72 is a spring end cap member 77 having a plurality of recesses 78 to receive the end of compression springs 79. The compression springs 79 act upon a presser plate 81 which is secured by welding 82 or other suitable means to the inner end of plunger 75. The presser plate 82 is provided with a central recess 83 to receive the inner end of the shaft 63. A friction plate 84 having friction material 85 secured thereto is fixedly mounted on the end of the shaft 63 adjacent to the presser plate 81 so that the friction material 85 may engage the presser plate 81. An extension 86 of plunger 75 extends through the outer end of the bush 73 and is screw-threaded to receive lock nuts 87. Loosely mounted on the extension 86 between the lock nuts 87 and the bush 72 is a rotary cam 88 from which a hand lever 89 extends for easy access by the driver. The adjacent surfaces 91 and 92 of the cam 88 and the bush 72 are of similar undulating forms so arranged that manual force applied to the lever 89 to rotate the cam 88 to cause the peaks of the undulations to engage so that the cam 88 will exert an axial force through the nuts 87 and the extension 86 on the plunger 75 to withdraw the presser plate 81 against the loading of springs 79 from the friction plate 84. The free end of the lever 89 will be carried within a suitable gate in one end position of which the cam surfaces 91 and 92 fit one within the other so that no axial force is exerted on the plunger 75 and in the other of which the peaks of the undulations engage one another so that the plunger 75 and presser plate 81 are withdrawn from the friction plate 84. This friction clutch assembly is intended for use only during driving over long distances to avoid the necessity for the driver to press continuously on a pedal.

In driving a tractor having the apparatus of FIGURES 3, 4 and 5 the driver, in order to move forwardly, will press with his right foot on the pedal 42. This will cause anti-clockwise rotation of lever 48 as seen in FIGURE 4 which in turn will cause clockwise rotation of the centrally pivoted lever 59 and movement of the link 67 to the right. The amount by which the pedal 42 is depressed will determine the magnitude of the forward speed ratio and thus the forward speed of the tractor. By the movement of pedal 42 the lever 51 will be rotated in the clockwise sense as seen in FIGURE 4 and it will engage and deflect the leaf spring 69. If the driver removes his foot from the lever 42 the spring 69 will act on the lever 51 to tend to restore centrally pivoted lever 59 to the zero speed ratio position. If the driver wishes to lock the lever 59 in any particular position he will move the lever 89 to remove tension from the plunger 75 to permit the presser plate 81 under spring force to engage the friction plate 84 to lock it against rotation. Locking of the plate 84 will, of course, lock the lever 59 against rotation. The arrangement of the friction lock 65 is such that in the event of an emergency the driver by suitably pressing on one or the other pedals 41 or 42 can overcome the friction and adjust the speed ratio of the transmission in a desired direction. When the driver wishes to move the tractor rearwardly he will press on the pedal 41 which will cause anti-clockwise movement of the lever 59 as seen in FIGURE 4 and movement of the link 67 to the left as seen in FIGURE 4. The lever 43 will then move clockwise as seen in FIGURE 4 to engage and deflect the leaf spring 69.

Braking for either direction of movement is obtained when the driver lifts his foot from the pedals to allow them to return to the zero speed ratio position under spring action.

The advantage of the described embodiments of the invention are that the driver need use only one foot for adjusting the transmission speed ratio, such adjustment enabling either forward or reverse propulsion of the vehicle to be obtained and at the same time ensuring that if the driver removes his foot from the pedals the transmission will return to the zero speed ratio position. The locking device is provided in both embodiments for the purpose of convenience for the driver where it is necessary to drive the tractor in one direction over a long distance. The locking device will then save the driver the need to press continuously with his foot on one or the other of the pedals. The fact that one foot only is necessary to control the transmission leaves free the driver's other foot and his hands to operate other controls associated with the vehicle. For example agricultural tractors are used with a variety of accessory implements which present the driver with a number of controls which he must operate manually whilst the tractor is moving. The present invention provides a simple control requiring a pushing force from one foot of the driver only by which he can select forward, or reverse, propulsion or braking of the vehicle. The engine may be governed to a constant speed or a speed control may be connected for adjustment by the speed ratio adjusting apparatus such that engine speed increases with speed ratio and vice versa.

Whilst the described embodiments show the two pedals located on one side of a vehicle for alternative engagement by one of the driver's feet it will be appreciated that within the broad scope of the invention the pedals may be so placed that the driver may place his feet one on each pedal. For example the pedals may be located one on each side of the vehicle and the driver may rest his feet continuously on the pedals during driving.

We claim as our invention:

1. In a vehicle having ground engaging elements interconnected with a source of power by a hydraulic power transmission, apparatus for controlling the speed ratio of the transmission including a pair of pedals in the area of the driving position, to be operated by the driver, a lever which is pivotally mounted about a central pivot thereon, and interconnected with the transmission so that pivotal movement of the lever in one direction of rotation adjusts the speed ratio of the transmission toward one limit of its adjustment, whereas pivotal movement of the lever in the opposite direction of rotation adjusts the speed ratio toward the other limit of its adjustment, yieldable biasing means tending to station the lever in a predetermined angular position about its pivot, and means operatively interconnecting the pedals with opposite end portions of the lever respectively so that alternative operation of the pedals operates to pivot the lever in one or the other direction of rotation, for adjustment of the transmission speed ratio.

2. In a vehicle according to claim 1 where the pedals are so relatively disposed, in relation to the driver and to one another, that the driver may operate them in alternative fashion by one foot.

3. In a vehicle according to claim 1 further comprising means operative to lock the lever in any one of a plurality of angular positions, independently of the pedals.

4. In a vehicle according to claim 1 wherein the biasing means tends to station the lever at zero speed ratio position.

References Cited by the Examiner

UNITED STATES PATENTS

| | | | |
|---|---|---|---|
| 591,210 | 10/1897 | Crane | 74—470 |
| 806,708 | 12/1905 | Perry | 74—560 |
| 941,407 | 11/1909 | Cox | 74—474 X |
| 1,316,079 | 9/1919 | Borsella. | |
| 1,780,460 | 11/1930 | Burtnett | 74—474 |
| 2,108,666 | 2/1938 | Hall. | |
| 2,667,939 | 2/1954 | Purkey | 74—478 X |
| 2,821,091 | 1/1958 | Benner. | |
| 3,040,596 | 6/1962 | Du Shane et al. | 74—560 X |
| 3,096,663 | 7/1963 | Sink | 74—481 |
| 3,157,063 | 11/1964 | Mussell | 74—512 |

FOREIGN PATENTS

| | | |
|---|---|---|
| 220,694 | 2/1959 | Australia. |
| 621,667 | 6/1961 | Canada. |
| 185,304 | 9/1922 | Great Britain. |

FRED C. MATTERN, Jr., *Primary Examiner.*

BROUGHTON G. DURHAM, *Examiner.*

C. F. GREEN, *Assistant Examiner.*